(12) United States Patent
Saillet et al.

(10) Patent No.: US 11,397,855 B2
(45) Date of Patent: Jul. 26, 2022

(54) DATA STANDARDIZATION RULES GENERATION

(71) Applicant: INTERNATIONAL BUSINESS MACHINES CORPORATION, Armonk, NY (US)

(72) Inventors: Yannick Saillet, Stuttgart (DE); Martin Oberhofer, Bondorf (DE); Namit Kabra, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 1075 days.

(21) Appl. No.: 15/838,463

(22) Filed: Dec. 12, 2017

(65) Prior Publication Data

US 2019/0179888 A1 Jun. 13, 2019

(51) Int. Cl.
*G06F 40/284* (2020.01)
*G06N 5/04* (2006.01)
*G06N 5/02* (2006.01)
*G06K 9/62* (2022.01)
*G06F 16/33* (2019.01)
*G06F 40/242* (2020.01)

(52) U.S. Cl.
CPC ............ *G06F 40/284* (2020.01); *G06F 16/33* (2019.01); *G06F 40/242* (2020.01); *G06K 9/6256* (2013.01); *G06N 5/02* (2013.01); *G06N 5/04* (2013.01)

(58) Field of Classification Search
CPC ........ G06F 16/30; G06F 40/284; G06F 16/33; G06F 40/242; G06K 9/6256; G06N 5/02; G06N 5/04
See application file for complete search history.

(56) References Cited

U.S. PATENT DOCUMENTS

| 8,635,197 B2 | 1/2014 | Chaturvedi et al. |
| 9,582,555 B2 | 2/2017 | Kapadia et al. |
| 2005/0192792 A1* | 9/2005 | Carus ............ G06F 40/30 704/2 |

(Continued)

OTHER PUBLICATIONS

Christen et al., "Automated Probabilistic Address Standardisation and Verification," Proceedings of the 4th Australasian Data Mining Conference—AusDM05, Dec. 5-6, 2005, Sydney, Australia (Year: 2005).*

(Continued)

*Primary Examiner* — Miranda M Huang
*Assistant Examiner* — Yao David Huang
(74) *Attorney, Agent, or Firm* — Michael A. Petrocelli

(57) ABSTRACT

A method for generating data standardization rules includes receiving a training data set containing tokenized and tagged data values. A set of machine mining models is built using different learning algorithms for identifying tags and tag patterns using the training set. For each data value in a further data set: a tokenization is applied on the data value, resulting in a set of tokens. For each token of the set of tokens one or more tag candidates are determined using a lookup dictionary of tags and tokens and/or at least part of the set of machine mining models, resulting for each token of the set of tokens in a list of possible tags. Unique combinations of the sets of tags of the further data set having highest aggregated confidence values are provided for use as standardization rules.

18 Claims, 6 Drawing Sheets

(56) References Cited

U.S. PATENT DOCUMENTS

| | | | | |
|---|---|---|---|---|
| 2009/0006282 | A1* | 1/2009 | Roth | G06N 5/022 |
| | | | | 706/12 |
| 2009/0281791 | A1* | 11/2009 | Li | G06F 40/284 |
| | | | | 704/9 |
| 2012/0047179 | A1 | 2/2012 | Faruquie et al. | |
| 2012/0066214 | A1* | 3/2012 | Nelke | G06F 16/258 |
| | | | | 707/723 |
| 2013/0124203 | A1* | 5/2013 | Scoggins, II | H04N 21/4307 |
| | | | | 704/235 |
| 2013/0212073 | A1* | 8/2013 | Cochrane | G09B 7/02 |
| | | | | 707/687 |
| 2014/0136188 | A1* | 5/2014 | Wroczynski | G06F 40/284 |
| | | | | 704/9 |
| 2014/0324435 | A1* | 10/2014 | Bellegarda | G10L 13/10 |
| | | | | 704/260 |
| 2016/0275417 | A1* | 9/2016 | Welinder | G06N 20/00 |
| 2017/0308927 | A1* | 10/2017 | Woods | H04L 67/22 |
| 2017/0315984 | A1* | 11/2017 | Goyal | G06F 40/205 |
| 2018/0181843 | A1* | 6/2018 | Brown | G06K 9/6254 |
| 2019/0108593 | A1* | 4/2019 | Yadav | G06N 3/088 |

OTHER PUBLICATIONS

Tomanek et al., "Semi-Supervised Active Learning for Sequence Labeling," Proceedings of the 47th Annual Meeting of the ACL and the 4th IJCNLP of the AFNLP, pp. 1039-1047, Suntec, Singapore, Aug. 2-7, 2009 (Year: 2009).*

Kim, "Greedy ensemble learning of structured predictors for sequence tagging," Neurocomputing 150 (2015) 449-457 (Year: 2015).*

Wang et al., "A Probabilistic Address Parser Using Conditional Random Fields and Stochastic Regular Grammar," 2016 IEEE 16th International Conference on Data Mining Workshops (ICDMW), 2016, pp. 225-232, doi: 10.1109/ICDMW.2016.0039. (Year: 2016).*

Mejer et al., "Confidence Estimation in Structured Prediction." arXiv:1111.1386v1 [cs.LG] Nov. 6, 2011 (Year: 2011).*

* cited by examiner

FIG. 4B

| | Street name | Street type | Direction | House number | Apartment number | Zip | City | State | Country |
|---|---|---|---|---|---|---|---|---|---|
| 405 → | Street name | Street type | Direction | House number | Apartment number | Zip | City | State | Country |
| 403 → | St Andrew | St | N | 34 | Apt 34-3 | 94333 | LA | CA | US |
| 425 → | Street name | Street type | | House number | | Zip | City | State | Country |
| 423 → | Sunset | Blvd | | 54 | | 94333 | Los Angeles | CA | US |
| 429 → | Street Name | | | House number | | Zip | City | State | Country |
| 427 → | Main Street | | | 34 | | 92333 | LA | CA | US |
| 433 → | Street name | Street Type | | | | Zip | City | State | Country |
| 431 → | Palm | Beach Rd | | | | 92334 | LA | CA | US |

420

DATA STANDARDIZATION RULES GENERATION

BACKGROUND

The present invention generally relates to digital computer systems, and more particularly, to a method for generating data standardization rules.

SUMMARY

Various embodiments provide a method for generating data standardization rules, computer system and computer program product as described by the subject matter of the independent claims. Advantageous embodiments are described in the dependent claims. Embodiments of the present invention can be freely combined with each other if they are not mutually exclusive.

In one aspect, the invention relates to computer-implemented method for generating data standardization rules. The method includes: receiving a training set containing tokenized and tagged data values; providing a lookup dictionary of the tokens and associated tags present in the training data; building a set of machine mining models using different learning algorithms for identifying tags and tag patterns using the training set; for each data value in a further data set: applying a tokenization on the data value, resulting in a set of tokens; determining for each token of the set of tokens one or more tag candidates using the lookup dictionary and/or at least part of the set of machine mining models, resulting for each token of the set of tokens in a list of possible tags; for each unique combination of the set tags of the respective set of tokens, applying at least part of the machine mining models to determine respective confidence values; computing an aggregated confidence for each unique combination of the set tags of the respective set of tokens using the confidence values; providing at least part of the unique combinations of the further data set having the highest aggregated confidence values for use as standardization rules.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for generating data standardization rules. The computer system is configured for: receiving a training set containing tokenized and tagged data values; providing a lookup dictionary of the tokens and associated tags present in the training data; building a set of machine mining models using different learning algorithms for identifying tags and tag patterns using the training set; for each data value in a further data set: applying a tokenization on the data value, resulting in a set of tokens; determining for each token of the set of tokens one or more tag candidates using the lookup dictionary and/or at least part of the set of machine mining models, resulting for each token of the set of tokens in a list of possible tags; for each unique combination of the set tags of the respective set of tokens, applying at least part of the machine mining models to determine respective confidence values; computing an aggregated confidence for each unique combination of the set tags of the respective set of tokens using the confidence values; providing at least part of the unique combinations of the further data set having the highest aggregated confidence values for use as standardization rules.

BRIEF DESCRIPTION OF THE DRAWINGS

The following detailed description, given by way of example and not intended to limit the invention solely thereto, will best be appreciated in conjunction with the accompanying drawings, in which:

FIG. 4B is a table including sets of tokens and associated sets of tags, according to an embodiment of the present disclosure.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
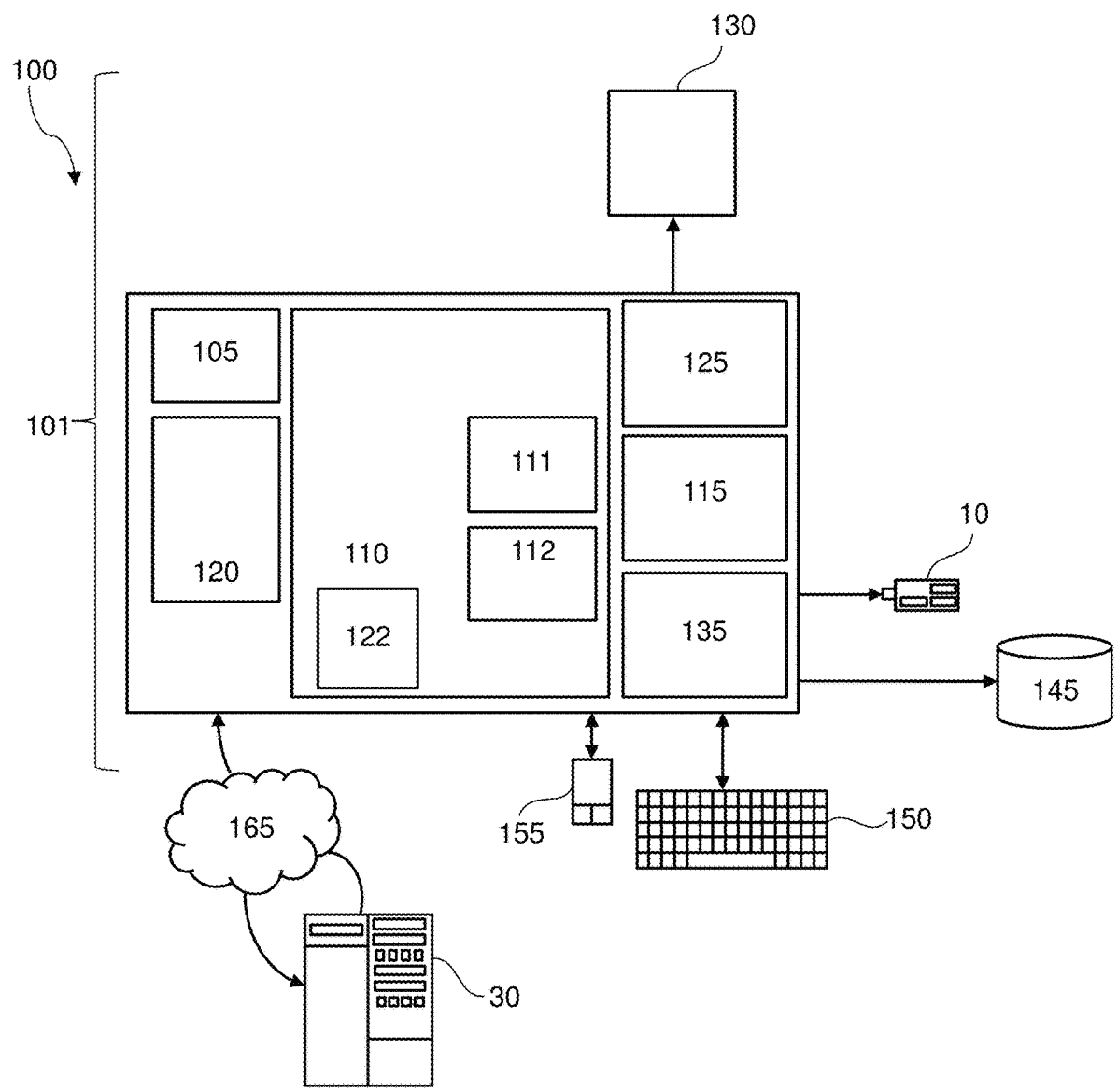
FIG. 1 represents a computerized system suited for implementing one or more method steps, according to an embodiment of the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments.

In the interest of not obscuring the presentation of embodiments of the present invention, in the following detailed description, some processing steps or operations that are known in the art may have been combined together for presentation and for illustration purposes and in some instances may not be described in detail. In other instances, some processing steps or operations that are known in the art may not be described at all. It should be understood that the following description is rather focused on the distinctive features or elements of various embodiments of the present invention.

Building standardization rules such as standardization rules for names or addresses are location dependent since names and addresses formats are different by country. The development of standardization dictionaries requires deep technical skills to understand the lexical algorithms and how they produce pattern outputs. For example, the development of an address standardization dictionary for a single country may take more than one year. Thus, there is a need to improve the development process of standardization rules.

The terminology used herein was chosen to best explain the principles of the embodiments, the practical application or technical improvement over technologies found in the marketplace, or to enable others of ordinary skill in the art to understand the embodiments disclosed herein.

The term "machine learning" refers to a computer algorithm used to extract useful information from training data by building probabilistic models (referred to as machine learning models or machine learning models) in an automated way. The machine learning may be performed using one or more learning algorithms such as linear regression, K-means etc.

A "model" may for example be an equation or set of rules that makes it possible to predict an unmeasured value (e.g. which tag corresponds to a given token) from other, known values.

The "standardization" refers to a process of transforming data to a predefined data format. The data format may include a common data definition, format, representation and structure. The data that is to be transformed is the data that is not conform to the predefined data format. For example, the process of transforming the data may include processing the data to automatically transform the data where necessary to comply with those common representations that define the data format. This process of transforming data may include identifying and correcting invalid values, standardizing spelling formats and abbreviations, and validating the format and content of the data.

The term "data value" as used herein refers to a sequence of symbols such as characters, words and/or phrases. The data value may for example be a sentence, and address etc. The data value may include one or more tokens.

The term "token" refers to a syntactic element or linguistic unit, such as a phrase, a word, or a set of one or more characters. The term token may be a value of an attribute or tag. The term tag or attribute refers to a property associated with a given input token.

The term "dataset" as used herein refers to a collection of data values. The data set may be in the form of record sand contained in a file for example. Each data value may be a record of the dataset.

The term "tokenization" refers to segmenting a data value or a text into linguistic units (or tokens) such as words, numbers, alpha-numerics. The tokenization may for example be performed using one or more rules. The rules may specify the characters (e.g. letters, numbers, special characters, etc.) and the patterns of the characters (one or more contiguous characters, every individual character, etc.) that comprise tokens. A rule of the rules may for example require the selection of texts that are placed between comas, or between a coma and space or between spaces etc., where the selected texts form the linguistic units or tokens.

A unique combination of a given data value is determined by both the type of tags and the order in which the tags are organized for the given data value. For example, the tokenization of a data value may result in the set of tokens "tokA", "tokB" and "tokC". Each of the tokens may be associated with respective tags. "tokA" can be "tagA1" or "tagA2", "tokB" can be "tagB" and "tokC" can be "tagC". Examples of unique combinations may be "tagA1, tagB, tagC", "tagB, tagA1, tagC" etc. If for example, the unique combination "tagB, tagA1, tagC" has the highest aggregated confidence value it may be used for generating a standardization rule. And the standardization rule may for example indicate "tokA is tagA1 (and not tagA2)", "tokB is tagB", "tokC is tagC" and/or the order in which they appear from left to right as follows "tagB followed by tagA1 and followed by tagC".

Embodiments of the present disclosure generally relate to the field of digital computer systems, and more particularly to a method for generating data standardization rules. The following described exemplary embodiments provide a system, method, and program product to, among other things, enable the use of a machine learning-based approach for dictionary development standardization. Therefore, the present embodiments have the capacity to improve the technical field of digital computer systems by, at a minimum, reducing the time required to build standardization dictionary rules, such as standardization rules for names and/or addresses, from years to a few days or weeks at most, thereby saving development efforts and allowing dictionary development standardization for significantly more domains.

Referring now to FIG. 1, a general computerized system is shown, according to an embodiment of the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101 (hereinafter referred to as "computer").

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which includes an ordered listing of executable instructions for implementing logical functions, notably functions involved in embodiments of this invention. In the example of FIG. 1, software 112 in the memory 110 includes instructions, e.g. instructions to manage databases such as a database management system. The memory 110 may further include a query optimizer. The query optimizer may include instructions e.g. software instructions that when executed may provide a query execution plan for executing a given query.

The software 112 in memory 110 shall also typically include a suitable operating system (OS) 111. The OS 111 essentially controls the execution of other computer programs, such as possibly software 112 for implementing methods as described herein.

The methods described herein may be in the form of a source program, executable program (object code), script, or any other entity including a set of instructions to be performed. When a source program, then the program needs to be translated via a compiler, assembler, interpreter, or the like, which may or may not be included within the memory 110, to operate properly in connection with the OS 111. Furthermore, the methods can be written as an object-oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may include a disk storage such as HDD storage.

Figure 2:
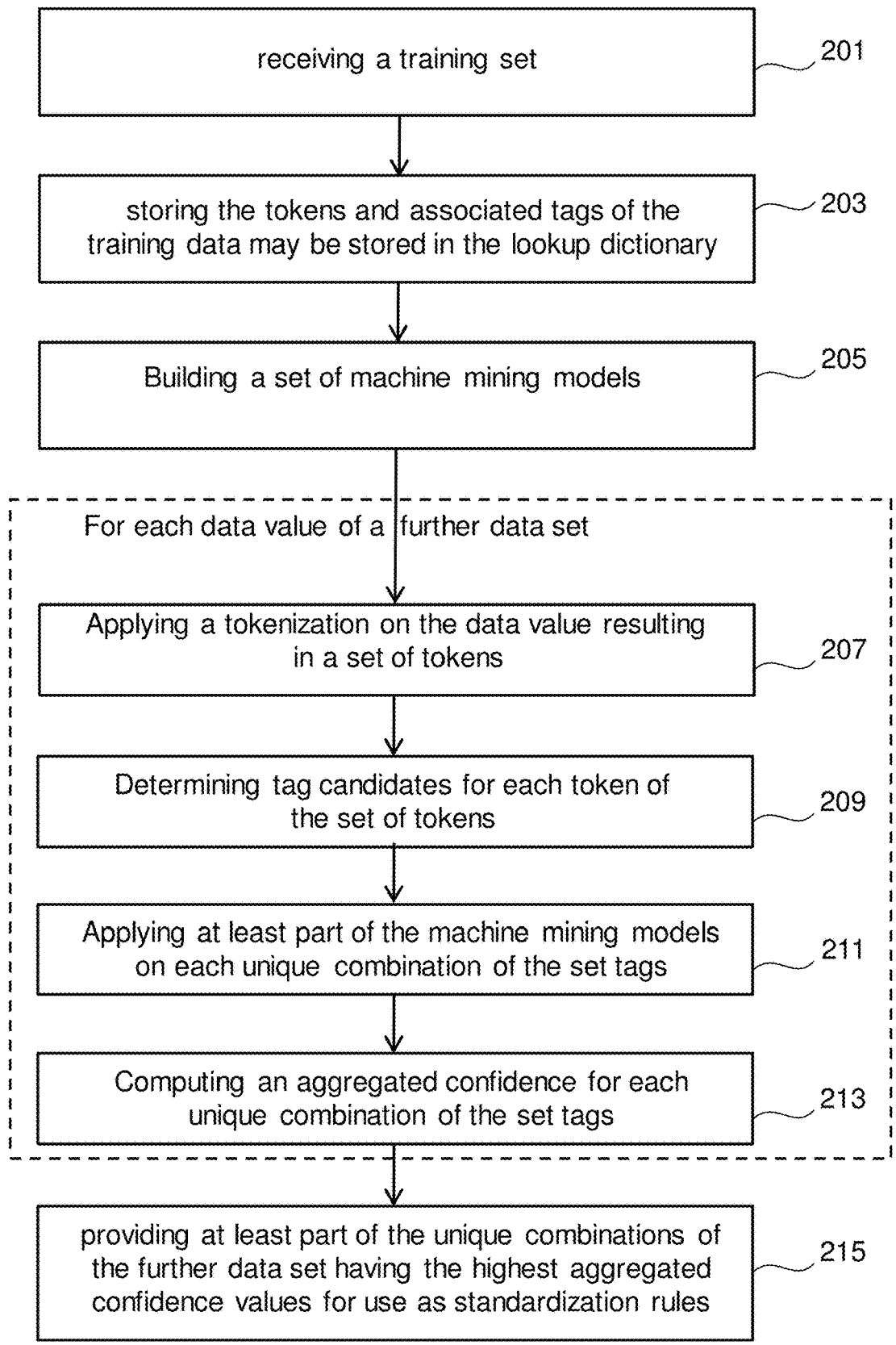
FIG. 2 is a flowchart of a method for providing recommendations about processing datasets, according to an embodiment of the present disclosure.

Referring now to FIG. 2, a flowchart depicting steps of a method for generating data standardization rules is shown, according to an embodiment of the present disclosure.

In step 201, a training set containing tokenized and tagged data values may be received. The training set may for example be received on a periodic basis. In another example, the training set may be received upon requesting the training set.

The training set (training data) may for example be built as follows. The training set may include first N data values. The first N data values may be tokenized. Each token may be classified by using a standard classifier for well-known domains like Zip code, cities, etc. . . . and a lookup dictionary of previously processed tokens and their classifications. For tokens where the classification is unknown or ambiguous, a user may request to tag those tokens. The result is a tokens and associated tags obtained.

In step 203, the tokens and associated tags present in the training set may be stored in the lookup dictionary. In case the lookup dictionary does not exist, it may be created and the tokens and associated tags present in the training data may be stored therein.

In step 205, a set of machine mining models may be built using different learning algorithms for identifying tags and tag patterns using the training set.

A first machine mining model may be obtained by learning the relative position of the type of tags by using algorithms like sequential pattern (e.g. for finding rules like item1 is typically followed by item 2 and then by item 3). For example, in case of addresses the first machine mining model may be configured to indicate or predict that a tag "street type" follows tag "street name" with 98% confidence; and a tag "City" follows tag "ZIP code" with 90% confidence, etc.

A second machine mining model may be obtained by learning the absolute position of types of tags by using classification algorithms or general statistics. For example, in case of address domain, the second machine mining model may be configured to predict that 95% of the data values begin with street name with 98% confidence, the last tag of a data value is a country code and the fifth tag of a data value is the zip code with 70% confidence, etc.

A third machine mining model may be obtained by learning which tags always occur together, which ones are optional, and which ones are mandatory by using an association algorithm (algorithm finding rules like "if ITEM1+ ITEM2 is in an item set then ITEM3 is also in the same item set"). For example, if tag "street name" is present then tag "house number" is also present with 90% confidence; and if tags "city" and "zip code" are present, then tag "country" is present with 70% confidence.

A fourth machine mining model may be a predictive or classification model that is configured to predict the value of certain type of tags given the value of the other type of tags. For example, if a token "San Francisco" is classified as tag "city" then a token is expected to be "CA" and classified as tag "state" with 80% confidence, etc.

A fifth machine mining model may be built as a domain fingerprints out of the values already classified as a certain tag. The fifth machine mining model may be configured to compute the likeliness that a token with an unknown tag belongs to a certain tag. For example, values made up of five digits have high confidence to be valid zip codes. Values made up of certain combination of letters have high confidence to be street name, etc. The fifth machine mining model may predict the tag using the characteristics of the values such as value length, characters or N-Grams composing the value, value format, etc. and by using those characteristics to derive tags or range of tags from the domain fingerprints.

Upon building (training) or generating the machine mining models, new data values of a further data set may be processed in order to determine tags and tokens.

Steps 207-213 may be performed for each data value in the further data set. A data value may, for example, include an electronic text which is a linear sequence of symbols, such as characters and/or words and/or phrases.

In step 207, a tokenization may be applied on the data value, resulting in a set of tokens. The tokenization of the data value may include a segmentation of the data value into tokens (or linguistic units) such as paragraphs, sentences, or individual words.

For example, the tokenization of data value "St. Andrew St. N 34, Apt. 34-3, 93433 Los Angeles, Calif., US" may result in the set of tokens: "St", "Andrew", "St", "N", "34", "Apt", "34-3", "93433", "Los Angeles", "CA", and "US".

In step 209, one or more tag candidates may be determined for each token of the set of tokens. This may be performed using at least the lookup dictionary and/or at least part of the set of machine mining models. This may result for each token of the set of tokens in a list of possible tags. For example, if the set of tokens includes tok1 and tok2, tok1 may be associated with tags tag1a and tag1b, and tok2 may be associated with tags tag2a and tag2b.

For example, tag candidates of a token may be determined or computed by using standard classifiers, the previously classified tokens (e.g. computed in the training phase and stored in the lookup dictionary) and/or the domain fingerprints built in building step 205.

In step 211, for each unique combination of the set tags of the respective set of tokens, at least part of the machine mining models may be applied to determine respective confidence values. A confidence value may indicate how correct the associations between the tags and tokens are. A unique combination is a combination unique in types of the tags forming the combination and the order of the tags. Following the above example, unique combinations may include eight combinations: {tag1a, tag2a}, {tag1a, tag2b}, {tag1b, tag2a}, {tag1b, tag2b}, {tag2a, tag1a}, {tag2b, tag1a}, {tag2a, tag1b}, {tag2b, tag1b}. A combination {a, b} indicates that the tag "b" follows tag "a" in the sequence of characters of a string or data value.

For example, for each unique combination, the built machine mining models may be applied to obtain respective confidences for the unique combination. For example, if four machine mining models are applied on each of the eight combinations, each of the eight combinations may be associated with respective four confidence values.

In step 213, an aggregated confidence may be computed for each unique combination of the set tags of the respective set of tokens using the confidence values. Following the above example, a given unique combination is associated with four confidence values. The aggregation of the four confidence values results in the aggregated confidence of the given unique combination. The aggregation may, for example, be performed by averaging the four confidence values.

The execution of steps 207-213 may result in the aggregated confidences (group of aggregated confidences) of the unique combinations of the data value. Following the above example, a group of eight aggregated confidences may result for the data value. The repetition of steps 207-213 for other data values may result in respective groups of aggregated confidences.

In step 215, at least part of the unique combinations of the further data set having the highest aggregated confidence values may be provided for use as standardization rules. For example, the highest aggregated confidence of each resulting group may be obtained, and respective unique combination may be provided.

In one example, for each data value of the further data set, a highest aggregated confidence value may be determined. If the highest aggregated confidence of a given data value is higher than a predefined threshold, the set of tokens (e.g. tok1, tok2) of the given data value may automatically be classified or assigned to the unique combination (e.g. {tag1b, tag2a}) having that highest aggregated confidence. In this case, the pairs (tok1, tag1b) and (tok2, tag2a) may be provided in step 215. The lookup dictionary may for example be updated accordingly, e.g. the pairs (tok1, tag1b) and (tok2, tag2a) may be added to the lookup dictionary. However, if the highest aggregated confidence is smaller than the predefined threshold or the result are ambiguous, the pairs (tok1, tag1b) and (tok2, tag2a) may be stored in a separate table for the user to review. In this case, the pairs (tok1, tag1b) and (tok2, tag2a) may not be provided in step 215.

The provided unique combinations in association with their respective set of tokens may be used to update the built machine mining model. For example, after each N data values (of the further data set), the machine mining models may be updated with the updated list of already classified data.

Figure 3:
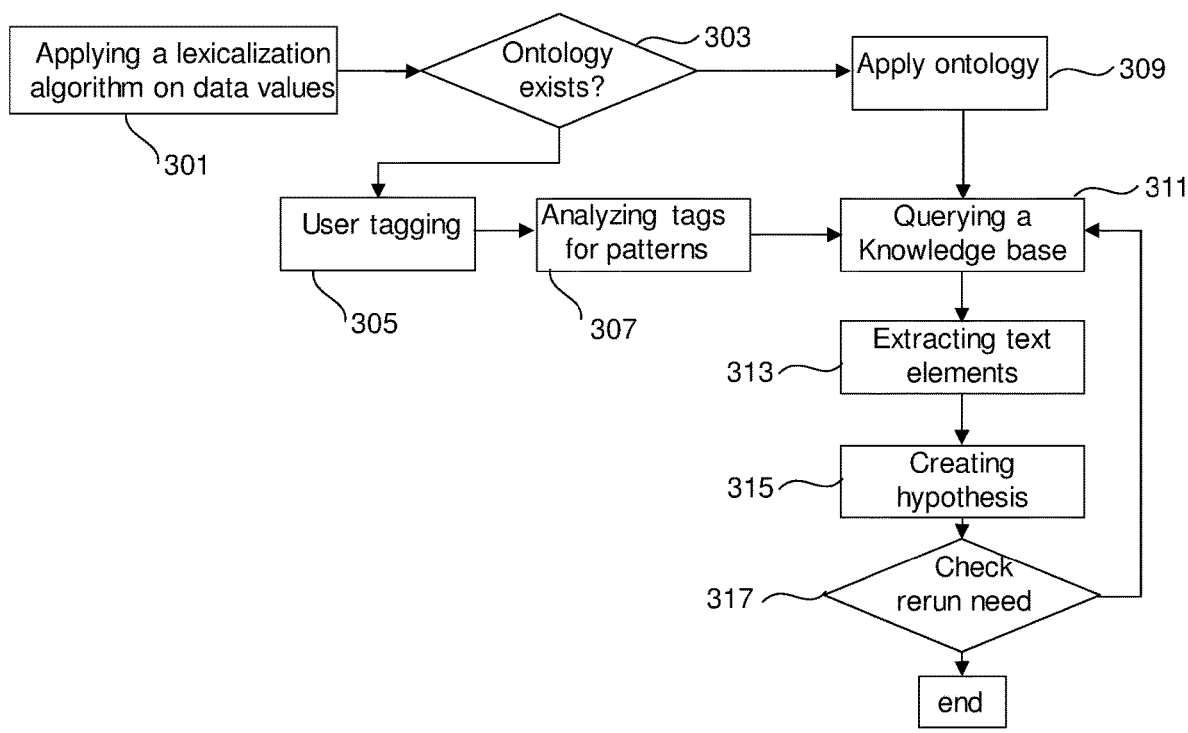
FIG. 3 is a flowchart of an example method for processing data values, according to an embodiment of the present disclosure.
Figure 4A:
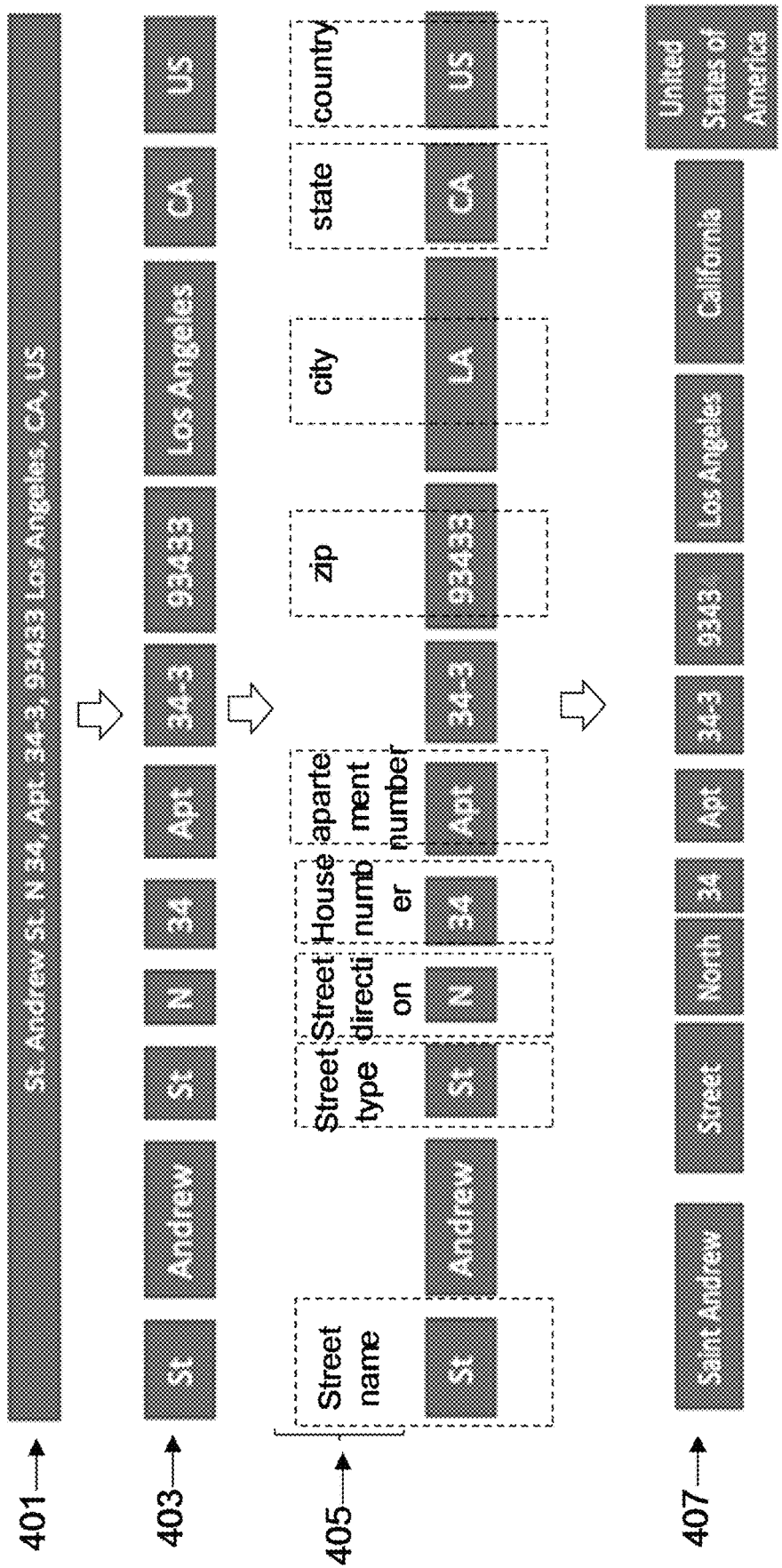
FIG. 4A is a block diagram illustrating processing steps of a data value, according to an embodiment of the present disclosure.
Figure 4C:
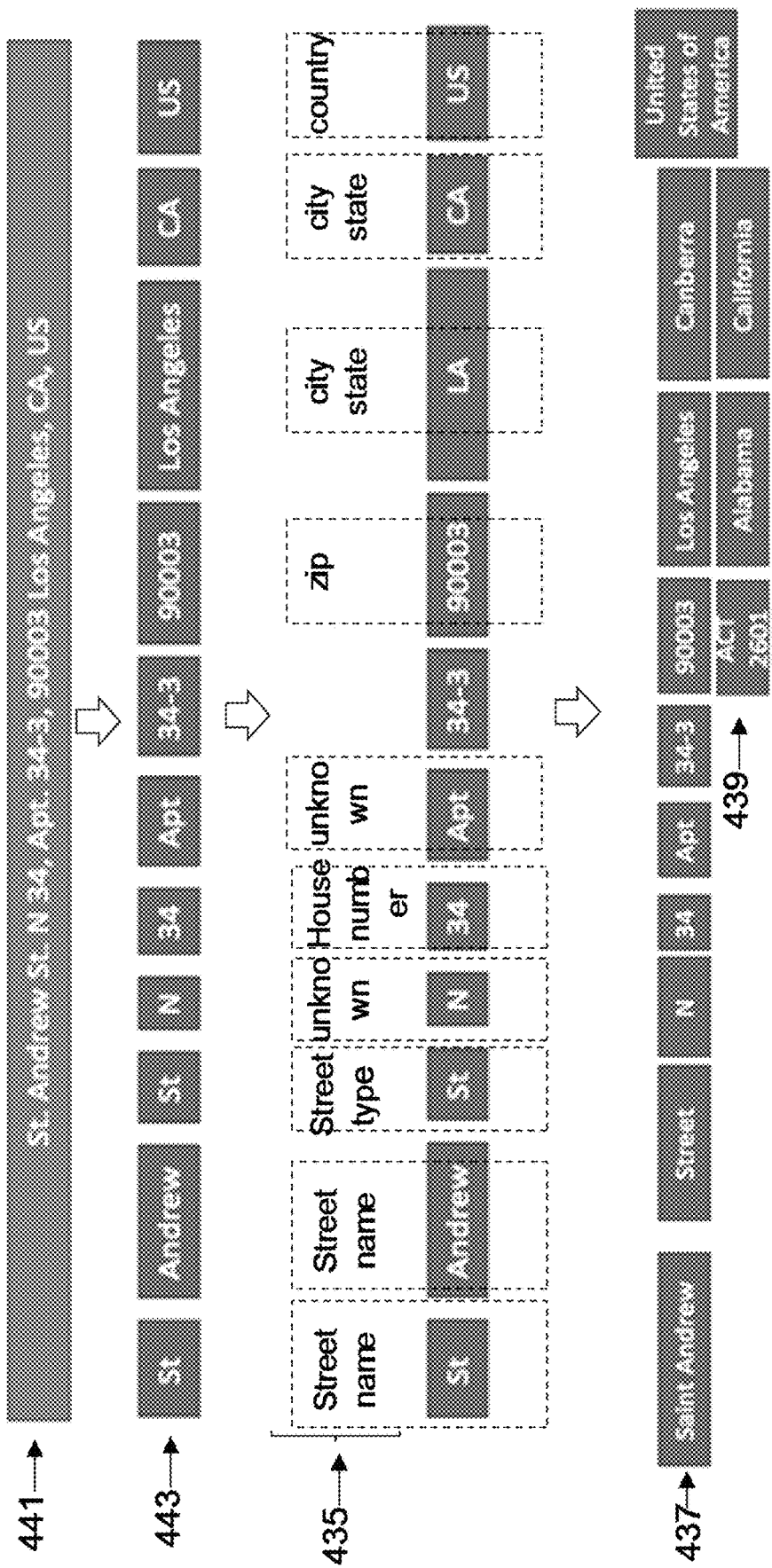
FIG. 4C is a block diagram illustrating processing steps of another data value, according to an embodiment of the present disclosure.

Referring now to FIG. 3, a flowchart depicting an example method for processing data values is shown, according to an embodiment of the present disclosure. The method of FIG. 3 will be described with reference to the examples of FIGS. 4A-C. For example, FIG. 4A shows a data value 401 "St. Andrew St. N 34, Apt. 34-3, 93433 Los Angeles, Calif., US" to be processed. FIG. 4C shows another data value 441 "St. Andrew St. N 34, Apt. 34-3, 90003 Los Angeles, Calif., US" to be processed. Data values 401 and 441 are part of data values of the first subset.

In step 301, a lexicalization algorithm or tokenization may be applied to get to tokenized input representation of the input data values, e.g. 401, 441. This step may, for example, further include filtering out of special characters such as whitespaces, dots, etc. from the input data value 401, 441. As indicated in FIG. 4A, the application of the lexicalization algorithm results in the set of tokens 403: "St", "Andrew", "St", "N", "34", "Apt", "34-3", "93433", "Los Angeles", "CA", and "US". Also indicated in FIG. 4C, that the application of the lexicalization algorithm results in the set of tokens 443: "St", "Andrew", "St", "N", "34", "Apt", "34-3", "90003", "Los Angeles", "CA", and "US".

In inquiry step 303, it may be determined if an address ontology (or ontology) exists. An ontology is a formal naming and definition of the types, properties, and interrelationships of the entities that exist in a particular domain of discourse. In this example, the domain is the address domain.

If (inquiry step 303) the address ontology does not exist, user tagging may start in step 305 (which may be a training step). For example, from the list of overall records or data values which have been tokenized, a first subset of the tokenized input data values may be presented to the user and let the user tag each token/group of tokens.

Following the example of data value 401, FIG. 4A indicates the user-provided tags 405 for the set of tokens 403. For example, the tokens "LA" is associated with tag "city" and token "93433" is associated with tag "zip", etc. Table 420 of FIG. 4B also shows the set of user tags 405 of the set of tokens 403 of the data value 401 in its first and second rows. Table 420 further shows another example of a set of user tags 425 and set of tokens 423 of the data value "Sunset Blvd, 54, 9433, Los Angeles, Calif., US".

The obtained user tags 405 from the first subset may for example be analyzed for patterns in step 307. For example, it may be determined that the combination of tags "City-State" appears in that order (city followed by state) more frequently than the combination of tags "State-City". Thus, if the order of the tags City and State is found as follows "State-City", the order may be changed to the most frequent pattern, namely "City-State" (this implies that the order of corresponding tokens may also be changed).

In another example, tag "apartment number" in terms of frequency distribution may be substantially less frequent than appearances of tags "Zip" and "Housenumber". In this case, a first rule may indicate that an address is acceptable if a value associated with tag "apartment number" is empty. A second rule may indicate that tag "Zip" must exist in an address. And, a third rule may indicate that tag "Housenumber" must exist all the time in the address (if an ontology is available, these three rules may be part of the ontology). These rules may be applied on the provided user tags 405.

These patterns derived from tagging help to determine the format of the address, more precisely in which order tags and corresponding tokens are expected to appear and what users consider "must" vs. "optional" parts.

If (inquiry step 303) the address ontology exists, the ontology may be applied in step 309 to the first subset of tokenized data values. For example, the ontology may be applied to the set of tokens 403 as indicated in FIG. 4C and tag the set of tokens 443 e.g. with the semantical concept they represent. For example, an address ontology for the United States, may comprise rules such as rules describing the zip code: A zip code is a 5-digit number. The zip code has to be placed after the state. The zip code has to be placed before the country. A rule may be an implementation using a regular expression. For example, the address ontology may indicate that an address needs attributes or tags: street, housenumber, zip, city, state, country and may include rules such as "country names have no numbers", "country is usually last entry of address", "house numbers have numbers in them" etc.

An example of the resulting set of tags 435 after application of the ontology is shown in FIG. 4C. The set of tags 435 obtained by the application of the ontology may be different from the set of tags 405 that are user defined. FIG. 4C indicates that some tokens have been correctly tagged whereas other tokens either got two tags (state, city) since they could not be correctly semantically identified yet. And, some tags might appear twice such as street type and for elements which could not yet placed—the placeholder tag "unknown" has been assigned at this stage.

In one example, both user tagging and ontology based tagging may be performed on the same data value. This may enable to compare results and resolve conflicts. For example, this may enable to correct tags "unknown" using the respective user tags 405.

Steps 301-309 may result in tags of tokens of data values of the first subset and patterns of the tags of the first subset. The second subset or remaining subset of tokenized input data values may be processed to assign to the tokens of the second subset respective tags using the results of tagging the first subset. For example, for tokens that are the same as tokens of the first subset processed before, the same tags may be assigned. FIG. 4B illustrates this. For example, the set of tokens 403 and 423 may be part of the first subset that has been processed by the user or the ontology (e.g. providing a training set). The set of tokens, e.g. 427 and 431, may be part of the second subset and may be processed automatically based on the results of tagging the first subset. For example, tokens like "US", "CA", etc. have been tagged by the users (as described above for the user of FIG. 3) with the vast majority with "Country", "State", etc. So, the computer system may tag the same tokens for other records which were not part of the tagging automatically as well. This is shown in FIG. 4B with the system-created tags 429 and 433.

Note that the notion of "same tokens" may be a configurable parameter where "same token" can be quantified with a similarity measure (which may be a single metric or a computed weighted score across several metrics) e.g. edit distance. For example, "USA" and "ISA" would have an edit distance of 1. If the similarity score is higher than a predefined similarity threshold the system would both assign the tag "country" even though the user tagging had that only assigned to "USA" since the value "ISA" was not part of the training set (the first subset).

The extraction of the standardization rules as described in the following steps 311-317 uses the sets of tags and corresponding tokens of the second subset. For simplification purpose, the same data value and set of tokens 403, 443 as the ones of the first subset are used for explanation. For example, in steps 311-317, the set of tokens 403 refers to a set of tokens of a data value of the second subset. The extraction of the standardization rules, as described in the following steps 311-317, uses the sets of tags and corresponding tokens of the second subset and/or additional information obtained as described below.

In step 311, a knowledge base may be queried with the set of tokens (e.g. 403) of a current data value of the second subset as input in order to obtain additional information. The knowledge base may be an internal system or external system or a combination thereof. For example, the knowledge base may include Google Maps, Wikipedia, OpenStreetMap or another source of information.

In step 313, appropriate text elements may be extracted from the additional retrieved information using a predefined one or more text analytics. For example, if the internet and external knowledge corpus is crawled, address information may be found on web sites. Using text analytics like Unstructured Information Management Architecture (UIMA) from the free text of the website the address related information may be extracted which form the extracted text elements.

For example, the extracted text elements 407 of FIG. 4A (or text elements 437 and 439 of FIG. 4C) may be the result of querying the knowledge base such as Google Maps with the set of tokens 403 (or 443). The text elements may indicate the correct assignment of tags to tokens of the set of tokens 403. By comparing the text elements 407 and the set of tokens 403, patterns may be identified which may form basis for standardization rules. The text elements 407, 437 and 439 may further indicate tags (not shown) associated with the tokens e.g. "Saint Andrew".

In step 315, hypothesis may be created and scored using the extracted text elements of the additional information and/or the sets of tags and corresponding tokens of the second subset. Based on the hypothesis a set of candidate standardization rules may be derived. FIG. 4C illustrates examples for hypothesis creation. The results of querying of the knowledge base may include the text elements 437 and 439. The text elements 437 and 439 have different tokens for the tags "Zip", "City" and "State". However, the tokens "90003"—"Los Angeles"—"California" of the text elements 437 may be found ten times, e.g. by querying 10 different knowledge bases. And, the tokens "ACT 2601"—"Canberra"—"Alabama" of the text elements 439 may be found only one time. The frequency of the results may be used for scoring the text elements 437 and 439. In addition or alternatively to using the frequency of the results for the scoring, the similarity between each of the text elements 437 and 439 with the set of tokens 443 may be used. In the example of FIG. 4C, for token 90003 of the set of tokens 443, there is a full match in the text elements 437; however, the token ACT2601 of the text elements 439 does not match 90003. This would increase the probability or the score for the text elements 437, and may decrease the score for the text elements 439. A hypothesis may then indicate "LA with higher probability is Los Angeles and exists in California, but not Alabama". Another hypothesis may indicate "State California more likely than Alabama".

For determined hypothesis, the standardization rules are taken as follows: 90003 is a zip attribute; LA is Los Angeles; LA is a city attribute. Other examples of standardization rules may include: "US is United States of America", "if "ST" appears twice, add one to street type and one to street name", "N is north", "St is street" etc.

The found standardization rules may for example be applied on a predefined data set.

For example, if (inquiry step 317) there are still remaining tokens with tag "unknown", steps 311-317 may be repeated until no token or a minimum number of tokens have "unknown" tag. Or if (inquiry step 317) the candidate standardization rules need to be confirmed k times (e.g. k=3), steps 311-317 may be repeated k-1 times. Each iteration of the steps 311-317 may use a different knowledge base. This may, for example, result in k sets of candidate standardization rules. By comparing the k sets of candidate standardization rules the final standardization rules may be derived. For example, a standardization rule that appears at least a predefined maximum number of times (e.g. two times) in the sets of standardization rules may be part of the final standardization rules.

In other embodiments, a method for generating token classification models for data standardization may include receiving a training set containing tokenized and tagged data values; providing a lookup dictionary of the values and associated tags present in the training data; building a set of machine mining models using different algorithms/techniques for capturing tag patterns using the training set; determining domain fingerprints based on token values associated with a certain tag, such domain fingerprints allowing to estimate likelihood that an unknown token value belongs to a certain class/tag; for data values in a further data set: tokenizing the data value; determining token tag candidates (e.g. using (known) classifiers, the lookup dictionary and/or the domain fingerprints), resulting a list of possible tags associated confidence values for each token; for each unique combination of tags/tokens, applying at least some of the machine mining models to determine the associated confidence value; computing an aggregated confidence for each unique combination of tags/tokens based on the associated confidence values; choosing the unique combination of tags/tokens having the highest aggregated confidence; updating the set of machine mining models (including the lookup dictionary) using the training set and the further data set; generating a list of all possible tag patterns; and storing the machine mining models (including the lookup dictionary) for classifying tokens and storing the list of all possible tag patterns for use as a standardization rule.

According to one embodiment, the unique combinations are provided in association with respective highest aggregated confidence values. For each processed data value of the further data set, the corresponding unique combination having the highest aggregated confidence value is provided. This may enable a larger sample of standardization rules. The higher the number of standardization rules the larger the datasets to be processed.

According to one embodiment, the highest aggregated confidence of each provided unique combination is higher than a predefined threshold. Using the predefined threshold may enable a reliable set of standardization rules with a higher probability of each rule being a true rule.

According to one embodiment, the method further includes prompting a user for a confidence of a given unique combination, and in response to receiving the confidence from the user comparing the received confidence with the predefined threshold, where the computing of the aggregated confidence is performed further using received confidence. This may further increase the reliability and accuracy of the provided standardization rules.

According to one embodiment, the method further includes querying a knowledge base for tags of a given data value, and receiving the set of tags in a given order, where the aggregated confidence of each unique combination of the given data value is revised based on the difference between the unique combination and the received tags. The knowledge base may for example include Google Maps and/or Wikipedia etc. This may further increase the reliability and accuracy of the provided standardization rules.

According to one embodiment, the method further includes in response to determining that the highest aggregated confidence of a given unique combination is smaller than a predefined threshold, prompting a user for a confidence of the given unique combination, and in response to receiving the confidence from the user comparing the received confidence with the predefined threshold, where the given unique combination is provided as a standardization rule in case the received confidence is higher than the predefined threshold.

According to one embodiment, the method further includes updating the lookup dictionary using the set of tags and set of tokens of each provided unique combination and updating the set of machine mining models using the updated lookup dictionary. This may further tune the content of the databases and the models for further improved predictions of standardization rules.

According to one embodiment, the method further includes repeating the steps described above for another data set using the updated set of machine mining models.

According to one embodiment, the training set is obtained by at least one of: tokens and associated tags obtained by applying an ontology on the tokens; and tokens and associated user defined tags. The ontology may be advantageous as it may serve as semantic glue between heterogeneous or incompatible information. This may enable a systematic method for generating reliable and accurate training sets. This may further save processing time for generating the standardization rules.

According to one embodiment, the set of machine mining models includes at least one of: a model for predicting the relative position of the set of tags of a given data value; a model for predicting the absolute position of the set of tags in a given data value; a model using as input the token associated to each tag for predicting the confidence of the association token-tag given the other associations token-tags for the same data value; a model for predicting for each token a candidate tag. For example, a data value may include one token CA which has a tag candidate State, a token San-Francisco which has as tag candidate City, and a 3rd token 94105 which has as tag candidate Zip. The model may compute the confidence that token 94105 is in the expected range for the tag Zip if it is assumed that State is CA and City is San-Francisco. The other model may predict the relative (and/or absolute) position of types of tokens (tags) within data values. As the tags associated to each token of a data value are unknown, the machine mining model may learn about the typical relative (and/or absolute) position of each tag in the data value.

According to one embodiment, each model of the machine mining models is configured to provide a confidence value for each prediction performed by the model.

According to one embodiment, the method is automatically performed. For example, upon storing a data set of data values, the present method may automatically be executed. If the lookup dictionary does not exist, it may automatically be created; otherwise it may automatically be updated with new values.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating data standardization rules, the method comprising:
receiving a training data set containing tokenized data values and associated tags, wherein each token in the tokenized data values is classified using a standard classifier for one or more domains and a lookup dictionary of previously processed tokens;
storing the tokenized data values and associated tags in the lookup dictionary;
based on the training data set, building a set of machine mining models using different learning algorithms for identifying tags and tag patterns, at least one machine mining model being built as a domain fingerprint using tokenized data values classified as a certain tag for predicting tag candidates using characteristics of a given data value including a value length, N-Grams composing the value, value format, and characteristics to derive the tag candidates and a range of tag candidates from the domain fingerprint, the domain fingerprint allowing to estimate a likelihood that an unknown token value belongs to the certain tag;
receiving a data set comprising one or more data values, each of the one or more data values including an electronic text composed of a linear sequence of symbols;
tokenizing each data value in the data set to obtain a set of tokens;
determining for each token in the set of tokens one or more tag candidates using the lookup dictionary and at least part of the set of machine mining models, each tag candidate being determined using a standard classifier, a previously classified token, and the domain fingerprint;
applying at least part of the set of machine mining models to determine confidence values for each unique combination of tag candidates associated with each token in the set of tokens for indicating an accuracy of the association between each unique combination of tag candidates and each token in the set of tokens;
computing an aggregated confidence value for each unique combination of tag candidates by calculating an average of the determined confidence values;
determining, for each token, a highest aggregated confidence value for a unique combination of tag candidates;
in response to determining that the highest aggregated confidence value of the unique combination is higher than a predefined threshold, using the unique combination of tag candidates as a standardization rule; and
automatically assigning the set of tokens to the unique combination of tag candidates and updating the lookup dictionary.

2. The method of claim 1, wherein the unique combinations are provided in association with respective highest aggregated confidence values.

3. The method of claim 1, further comprising:
prompting a user for a confidence value of a given unique combination;
in response to receiving the confidence value from the user, comparing the received confidence value with a predefined threshold; and
computing the aggregated confidence value using the received confidence value.

4. The method of claim 1, further comprising:
querying a knowledge base for tags of a data value; and
receiving the tags in a given order, wherein the aggregated confidence value of each unique combination of the data value is revised based on a difference between the unique combination and the received tags.

5. The method of claim 1, further comprising:
in response to determining that the highest aggregated confidence value of the unique combination is less than the predefined threshold, storing the unique combination of tag candidates in a separate table;
prompting a user to input a confidence value for the unique combination; and
in response to receiving the confidence value from the user, comparing the received confidence value with the predefined threshold, wherein the unique combination is provided as a standardization rule in case the received confidence value is higher than the predefined threshold.

6. The method of claim 1, further comprising:
updating the lookup dictionary using tokens and associated tag candidates for each unique combination; and

17 updating the set of machine mining models using the updated lookup dictionary.

7. The method of claim 1, wherein the training data set is obtained by at least one of:
tokens and associated tags obtained by applying an ontology on the set of tokens; and
tokens and associated user defined tags.

8. The method of claim 1, wherein the set of machine mining models comprises:
a first machine mining model for predicting a relative position of the one or more tag candidates of a given data value;
a second machine mining model for predicting an absolute position of the one or more tag candidates in a given data value;
a third machine mining model using as input a token associated to each tag candidate for predicting a confidence of an association token-tag given other associations token-tags for the same data value;
a fourth machine mining model for predicting for each token a candidate tag; and
a fifth machine mining model comprising the domain fingerprint built using the tokenized data values classified as the certain tag for predicting the one or more tag candidates.

9. The method of claim 1, wherein each model of the set of machine mining models is configured to provide a confidence value for each prediction performed by the model.

10. A computer system for generating data standardization rules, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving a training data set containing tokenized data values and associated tags, wherein each token in the tokenized data values is classified using a standard classifier for one or more domains and a lookup dictionary of previously processed tokens;
storing the tokenized data values and associated tags in the lookup dictionary;
based on the training data set, building a set of machine mining models using different learning algorithms for identifying tags and tag patterns, at least one machine mining model being built as a domain fingerprint using tokenized data values classified as a certain tag for predicting tag candidates using characteristics of a given data value including a value length, N-Grams composing the value, value format, and characteristics to derive the tag candidates and a range of tag candidates from the domain fingerprint, the domain fingerprint allowing to estimate a likelihood that an unknown token value belongs to the certain tag;
receiving a data set comprising one or more data values, each of the one or more data values including an electronic text composed of a linear sequence of symbols;
tokenizing each data value in the data set to obtain a set of tokens;
determining for each token in the set of tokens one or more tag candidates using the lookup dictionary and at least part of the set of machine mining models, each tag

18 candidate being determined using a standard classifier, a previously classified token, and the domain fingerprint;
applying at least part of the set of machine mining models to determine confidence values for each unique combination of tag candidates associated with each token in the set of tokens for indicating an accuracy of the association between each unique combination of tag candidates and each token in the set of tokens;
computing an aggregated confidence value for each unique combination of tag candidates by calculating an average of the determined confidence values;
determining, for each token, a highest aggregated confidence value for a unique combination of tag candidates;
in response to determining that the highest aggregated confidence value of the unique combination is higher than a predefined threshold, using the unique combination of tag candidates as a standardization rule; and
automatically assigning the set of tokens to the unique combination of tag candidates and updating the lookup dictionary.

11. The computer system of claim 10, wherein the unique combinations are provided in association with respective highest aggregated confidence values.

12. The computer system of claim 10, further comprising:
prompting a user for a confidence value of a given unique combination;
in response to receiving the confidence value from the user, comparing the received confidence value with a predefined threshold; and
computing the aggregated confidence value using the received confidence value.

13. The computer system of claim 10, further comprising:
querying a knowledge base for tags of a data value; and
receiving the tags in a given order, wherein the aggregated confidence value of each unique combination of the data value is revised based on a difference between the unique combination and the received tags.

14. The computer system of claim 10, further comprising:
in response to determining that the highest aggregated confidence value of the unique combination is less than the predefined threshold, storing the unique combination of tag candidates in a separate table;
prompting a user to input a confidence value for the unique combination; and
in response to receiving the confidence value from the user, comparing the received confidence value with the predefined threshold, wherein the unique combination is provided as a standardization rule in case the received confidence value is higher than the predefined threshold.

15. The computer system of claim 10, further comprising:
updating the lookup dictionary using tokens and associated tag candidates for each unique combination; and
updating the set of machine mining models using the updated lookup dictionary.

16. The computer system of claim 10, wherein the training data set is obtained by at least one of:
tokens and associated tags obtained by applying an ontology on the set of tokens; and
tokens and associated user defined tags.

17. The computer system of claim 10, wherein the set of machine mining models comprises:
a first machine mining model for predicting a relative position of the one or more tag candidates of a given data value;

a second machine mining model for predicting an absolute position of the one or more tag candidates in a given data value;

a third machine mining model using as input a token associated to each tag candidate for predicting a confidence of an association token-tag given other associations token-tags for the same data value;

a fourth machine mining model for predicting for each token a candidate tag; and a fifth machine mining model comprising the domain fingerprint built using the tokenized data values classified as the certain tag for predicting the one or more tag candidates.

18. The computer system of claim 10, wherein each model of the set of machine mining models is configured to provide a confidence value for each prediction performed by the model.

\* \* \* \* \*